(12) United States Patent
Hu (10) Patent No.: US 11,003,726 B2
(45) Date of Patent: May 11, 2021

(54) METHOD, APPARATUS, AND SYSTEM FOR RECOMMENDING REAL-TIME INFORMATION

(71) Applicant: TENCENT TECHNOLOGY (SHENZHEN) COMPANY LIMITED, Shenzhen (CN)

(72) Inventor: Yucheng Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 410 days.

(21) Appl. No.: 15/868,729

(22) Filed: Jan. 11, 2018

(65) Prior Publication Data

US 2018/0129749 A1 May 10, 2018

Related U.S. Application Data

(63) Continuation of application No. PCT/CN2016/078482, filed on Apr. 5, 2016.

(30) Foreign Application Priority Data

Sep. 8, 2015 (CN) .......................... 201510564481.3

(51) Int. Cl.
*G06F 16/2457* (2019.01)
*G06F 16/9535* (2019.01)
*G06F 16/00* (2019.01)

(52) U.S. Cl.
CPC .......... *G06F 16/9535* (2019.01); *G06F 16/00* (2019.01); *G06F 16/2457* (2019.01); *G06F 16/24575* (2019.01); *G06F 16/24578* (2019.01)

(58) Field of Classification Search
CPC .......... G06F 16/9535; G06F 16/24578; G06F 16/335; G06F 16/248; G06F 16/285; G06F 16/2457

(Continued)

(56) References Cited

U.S. PATENT DOCUMENTS 8,996,530 B2 * 3/2015 LuVogt .................. G06Q 10/10
707/740
9,514,133 B1 * 12/2016 Kursun ................. G06F 40/279

(Continued)

FOREIGN PATENT DOCUMENTS

CN 102663627 A 9/2012
CN 102681999 A 9/2012

(Continued)

OTHER PUBLICATIONS

The World Intellectual Property Organization (WIPO) International Search Report for PCT/CN2016/078482 dated Jul. 8, 2016 5 Pages (including translation).

*Primary Examiner* — Marcin R Filipczyk
(74) *Attorney, Agent, or Firm* — Anova Law Group, PLLC (57) ABSTRACT

A method for recommending real-time information includes: obtaining user behavior data of a user; based on the user behavior data, respectively calculating a short-term interest, a long-term interest, and a real-time interest of the user; determining an interest of the user according to the short-term interest, the long-term interest, and the real-time interest of the user; and recommending real-time information to the user based on the interest of the user.

16 Claims, 4 Drawing Sheets

(58) Field of Classification Search
USPC .......................................................... 707/707
See application file for complete search history.

(56) References Cited

U.S. PATENT DOCUMENTS

| | | | |
|---|---|---|---|
| 2007/0118498 A1* | 5/2007 | Song | ................. G06Q 30/0633 |
| 2014/0365468 A1* | 12/2014 | Ormont | ................. G06F 16/951 |
| | | | 707/722 |
| 2015/0088911 A1 | 3/2015 | Qiao et al. | |
| 2016/0239738 A1* | 8/2016 | Feng | ................. G06F 16/24578 |

FOREIGN PATENT DOCUMENTS

| | | |
|---|---|---|
| CN | 104090990 A | 10/2014 |
| CN | 104246751 A | 12/2014 |

\* cited by examiner

ME THOD, APPARATUS, AND SYSTEM FOR RECOMMENDING REAL-TIME INFORMATION

RELATED APPLICATION

This application is a continuation application of PCT Patent Application No. PCT/CN2016/078482, filed on Apr. 5, 2016, which claims priority to Chinese Patent Application No. 201510564481.3, filed with the Chinese Patent Office on Sep. 8, 2015 and entitled "METHOD, APPARATUS, AND SYSTEM FOR RECOMMENDING REAL-TIME INFORMATION", the content of all of which is incorporated herein by reference in its entirety.

FIELD OF THE TECHNOLOGY

The present disclosure relates to the field of communication technologies and, specifically, to a method, an apparatus, and a system for recommending real-time information.

BACKGROUND OF THE DISCLOSURE

With the rapid increase of Internet information, people are drowning in the sea of information. How to find needed information in the wide sea of information is an important problem.

To resolve such "information overload" problem due to massive Internet information resources, and to help users to rapidly obtain information they need from overwhelming massive information, the existing technology provides various information recommendation solutions. Information recommendation refers to recommending, according to interests and behaviors of a user, information in which the user is interested.

Existing recommendation algorithms can be mainly classified into two classes: the first is a behavior-based recommendation algorithm, and the second is a content-based recommendation algorithm. For the behavior-based recommendation algorithm, in general, statistical analysis is performed on a user's behavior on information, similarities among information items in a recommendation pool are calculated, and then information items having a higher information similarity and corresponding to the user's behavior is recommended to the user. For the content-based recommendation algorithm, keywords are given for various information categories, and interests of a user are analyzed. Thus, a key word interested by the user can be determined and, based on the interested keyword and the keywords of the various information categories, a recommendation list is calculated to be recommended to the user.

According to this disclosure, the existing recommendation solutions often need to rely on participation of a large number of users, or do not consider any change in interests of users. Thus, the timeliness is relatively poor. However, for real-time information such as news information, which has the characteristic of one-time consumption (that is, for news of same content, a user reads only once), the timeliness is extremely important. Therefore, for the real-time information, the recommendation effect of the existing recommendation solutions is not desirable.

SUMMARY

Embodiments of the present invention provide a method, an apparatus, and a system for recommending real-time information, to improve timeliness, and flexibly and accurately recommend real-time information most-likely interested by a user currently to the user in time, thereby greatly improving the recommendation effect.

An embodiment of the present invention provides a method for recommending real-time information, including: obtaining user behavior data of a user; based on the user behavior data, respectively calculating a short-term interest, a long-term interest, and a real-time interest of the user; determining an interest of the user according to the short-term interest, the long-term interest, and the real-time interest of the user; and recommending real-time information to the user based on the interest of the user. The respectively calculating a short-term interest, a long-term interest, and a real-time interest of the user includes: based on the user behavior data, calculating a daily interest weight of the user for each day within a preset period to obtain daily interest weights, and attenuating the daily interest weights according to time to obtain the short-term interest of the user; based on the user behavior data, calculating an interest weight of the user within a preset time range to obtain the long-term interest of the user, wherein the preset time range is greater than one day; and based on the user behavior data, determining an interest weight of information currently clicked by the user to obtain the real-time interest of the user.

Another embodiment of the present invention provides a non-transitory computer-readable storage medium containing computer-executable instructions for, when executed by one or more processors, performing a method for recommending real-time information. The method includes: obtaining user behavior data of a user; based on the user behavior data, respectively calculating a short-term interest, a long-term interest, and a real-time interest of the user; determining an interest of the user according to the short-term interest, the long-term interest, and the real-time interest of the user; and recommending real-time information to the user based on the interest of the user. The respectively calculating a short-term interest, a long-term interest, and a real-time interest of the user includes: based on the user behavior data, calculating a daily interest weight of the user for each day within a preset period to obtain daily interest weights, and attenuating the daily interest weights according to time to obtain the short-term interest of the user; based on the user behavior data, calculating an interest weight of the user within a preset time range to obtain the long-term interest of the user, wherein the preset time range is greater than one day; and based on the user behavior data, determining an interest weight of information currently clicked by the user to obtain the real-time interest of the user.

Other aspects of the present disclosure can be understood by those skilled in the art in light of the description, the claims, and the drawings of the present disclosure.

BRIEF DESCRIPTION OF THE DRAWINGS

To describe the technical solutions in the embodiments of the present invention, the following briefly introduces the accompanying drawings for describing the embodiments. Apparently, the accompanying drawings in the following description show merely some embodiments of the present invention, and a person skilled in the art may still derive other drawings from these accompanying drawings without creative efforts.

DESCRIPTION OF EMBODIMENTS

The following describes the technical solutions in the embodiments of the present invention with reference to the accompanying drawings. Apparently, the described embodiments are merely some but not all of the embodiments of the present invention. All other embodiments obtained by a person skilled in the art based on the embodiments of the present invention without creative efforts shall fall within the protection scope of the present disclosure.

The embodiments of the present invention provide a method, an apparatus, and a system for recommending real-time information.

Figure 1A:
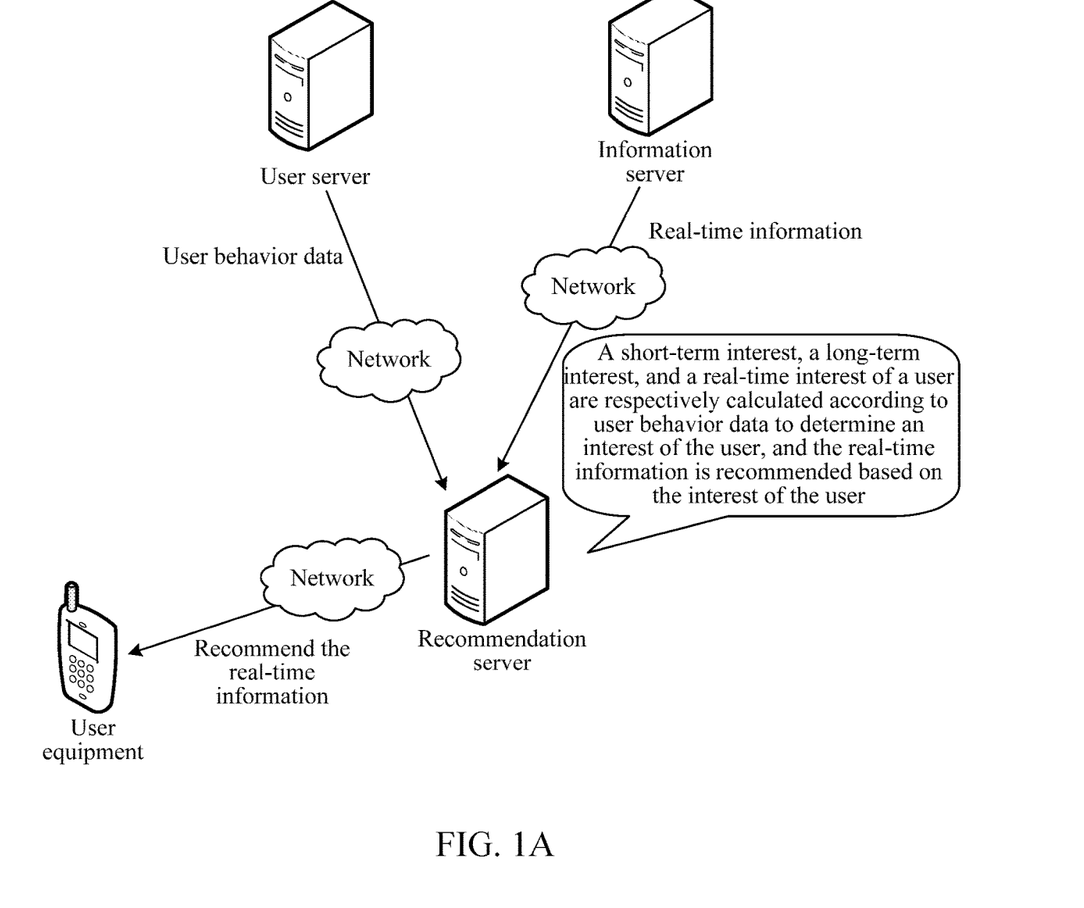
FIG. 1A is a schematic diagram of a system for recommending real-time information according to an embodiment of the present invention.

Referring to FIG. 1A, the system for recommending real-time information includes the apparatus for recommending real-time information provided in certain embodiments of the present invention. The apparatus for recommending real-time information may be specifically integrated in a server, for example, a recommendation server. In addition, the system for recommending real-time information may further include another device, for example, user equipment, a user server configured to store user behavior data, and an information server configured to store original real-time information, etc.

For example, an example in which the apparatus for recommending real-time information is integrated in the recommendation server is used. When real-time information needs to be recommended, the recommendation server may obtain the user behavior data from the user server, respectively calculate a short-term interest, a long-term interest, and a real-time interest of a user according to the user behavior data, then determine an interest of the user according to the short-term interest, the long-term interest, and the real-time interest of the user, obtain the real-time information from the information server, and recommend the real-time information, for example, news, to user equipment based on the interest of the user.

The short-term interest refers to an interest corresponding to an interest weight of the user that is calculated in a relatively short period. Specifically, an interest weight of the user of each day in a preset period (for example, 30 days) may be calculated according to the obtained user behavior data, so as to obtain a daily interest weight, and the daily interest weight is attenuated according to time to obtain the short-term interest. The long-term interest refers to an interest corresponding to an interest weight of the user that is calculated in a relatively long period. For example, an interest weight of the user within one year may be calculated according to the user behavior data. The real-time interest refers to an interest corresponding to a current interest weight of the user, for example, a keyword or a label currently clicked by the user.

According to an embodiment of the present disclosure, an apparatus for recommending real-time information is provided. The apparatus for recommending real-time information may be specifically integrated in a server, such as a recommendation server, etc.

The apparatus may perform a method for recommending real-time information which may include: obtaining user behavior data; respectively calculating a short-term interest, a long-term interest, and a real-time interest of a user according to the user behavior data; determining an interest of the user according to the short-term interest, the long-term interest, and the real-time interest of the user; and recommending real-time information to the user based on the interest of the user.

Figure 1B:
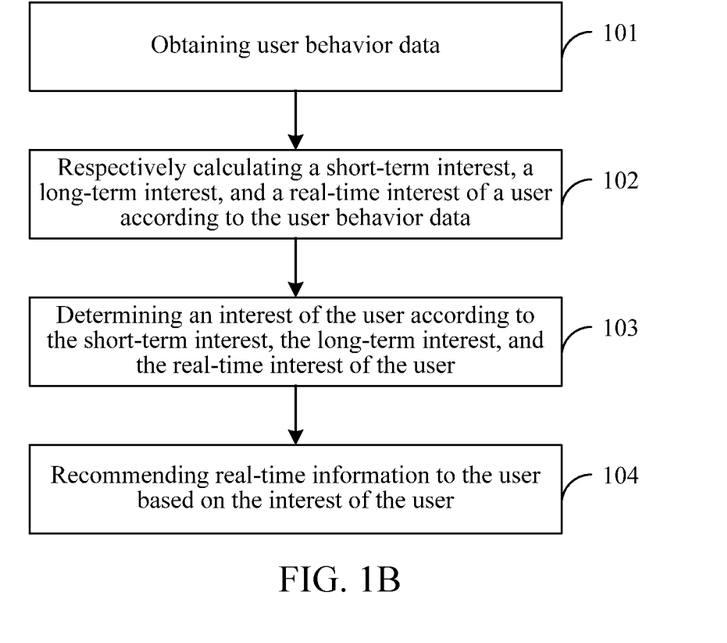
FIG. 1B is a flowchart of a method for recommending real-time information according to an embodiment of the present invention.

As shown in FIG. 1B, the method for recommending real-time information may include the followings.

101: Obtaining user behavior data of a user.

The user behavior data refers to related data that may be used for user behavior analysis, for example, browsing history, clicking history, and/or downloading history of the user. The user behavior data may be stored in the apparatus for recommending real-time information, or may be stored in another device, for example, a user server.

Specifically, using the user behavior data being stored in the user server as an example, the user behavior data may be obtained from the user server.

102: Respectively calculate a short-term interest, a long-term interest, and a real-time interest of the user according to the user behavior data. For example, the followings may be performed.

(1) Based on the user behavior data, calculating an interest weight of the user of each day in a preset period of time to obtain multiple daily interest weights within the preset period of time, and attenuating the daily interest weights according to time to obtain the short-term interest of the user.

There may be multiple ways in which attenuation is performed according to time, including the followings.

A: according to the daily interest weights, determining an interest weight that currently needs to be attenuated.

B: according to time, attenuating the interest weight that needs to be attenuated, so as to obtain an attenuated interest weight.

For example, a date difference between a date of the interest weight that needs to be attenuated and a current date may be determined; a product of the date difference and a preset attenuation coefficient is calculated, and a difference between 1 and the product is calculated; and then the interest weight that needs to be attenuated is multiplied by the difference to obtain the attenuated interest weight.

For example, if $\mu$ represents the attenuation coefficient, $D$ represents the date difference between the date of the interest weight that needs to be attenuated and the current date, and $interest\_weight_k$ represents the interest weight that needs to be attenuated, the attenuated interest $final\_weight_k$ is represented by the following formula:

$$final\_weight_k = interesr\_weight_k * (1 - D * \mu).$$

The attenuation coefficient may be set according to an actual application requirement, and details are not described herein.

C: repeating A and B until all interest weights that need to be attenuated in the daily interest weights are attenuated. That is, attenuation processing is performed according to time on the interest weight of each day to obtain attenuated daily interest weight for each day within the preset period of time.

D: performing statistical analysis on all obtained attenuated interest weights (e.g., attenuated daily interest weight for each day within the preset period of time) to obtain the short-term interest of the user.

The preset period may be set according to an actual application requirement, which for example, may be generally set to 7 days, 15 days, or 30 days.

For example, using 30 days as an example, if the current date is August 10, daily interest weights within 30 days, that is, from July 12 to August 10 may be obtained by using August 10 as a baseline. Then, the daily interest weights are attenuated according to time. For example, using August 8 as an example, because a date difference between August 8 and August 10 is two days, an attenuated interest weight final_weight$_{28}$ on August 8 is:

$$\text{final\_weight}_{28}=\text{interest\_weight}_{28}*(1-2*\mu).$$

Certainly, other attenuation ways may also be used.

(2) Based on the user behavior data, calculating an interest weight of the user within a preset time range to obtain the long-term interest of the user.

The preset time range may be set according to an actual application requirement, and is at least greater than one day, which, for example, may be set to one quarter, one year, or two years.

For example, using one year as an example, statistical analysis may be performed on monthly behavior of the user within one year from a current date according to the user behavior data; a monthly interest weights of each month can be calculated according to the monthly behavior of the user; an average interest weight within one year is calculated according to each monthly interest weight; and statistical analysis is performed on the average interest weight to obtain the long-term interest of the user.

Optionally, each monthly interest weight may also be attenuated according to time to obtain attenuated monthly interest weights. Then statistical analysis is performed on these attenuated interest weights to obtain the long-term interest of the user.

(3) According to the user behavior data, determining an interest weight currently clicked by the user to obtain the real-time interest of the user.

For example, if a message currently clicked by the user includes a keyword (or a label) "NBA", it is determined that the current interest of the user is "NBA". Therefore, an interest weight of the keyword "NBA" may be calculated. Thus, similarly, the real-time interest of the user may be obtained.

103: Based on the short-term interest, the long-term interest, and the real-time interest of the user, determining the interest of the user or the predicted interest of the user.

For example, the short-term interest, the long-term interest, and the real-time interest of the user may be merged according to a preset rule, so as to obtain the interest of the user.

Various ways may be used to merge the interests. For example, individual weights may be respectively set for the short-term interest, the long-term interest, and the real-time interest and, based on these respective weights, the short-term interest, the long-term interest, and the real-time interest are merged together. For another example, a function may be set for the relationships among the short-term interest, the long-term interest, and the real-time interest, and then the short-term interest, the long-term interest, and the real-time interest are merged together by using the function. Other ways may also be used.

104: Recommending real-time information to the user based on the interest of the user. The real-time information may include news, etc.

For example, based on the interest of the user, corresponding real-time information may be recalled from an inverted index of real-time information to obtain candidate recommendation information items and, based on the candidate recommendation information items, the real-time information is recommended to the user. More specifically:

A: Calculating a matching degree between each real-time information item in the candidate recommendation information items and the interest of the user to obtain an interest correlativeness of the real-time information.

B: Determining freshness of each real-time information item by determining a release time of each real-time information item in the candidate recommendation information items, so as to obtain timeliness of the real-time information. More recent real-time information, for example, more recent news, indicates higher timeliness.

C: Determining a click-through rate of each real-time information item in the candidate recommendation information items, and calculating a click-through model factor (CM) according to the click-through rate. Real-time information having a greater click-through rate has a greater model factor.

D: Determining the recommendation information from the candidate recommendation information items according to the interest correlativeness, the timeliness, and the click-through model factors.

For example, the real-time information items in the candidate recommendation information items may be scored according to the interest correlativeness, the timeliness, and the click-through model factors, and then real-time information items whose scores are higher than a preset threshold are determined as the recommendation information. The preset threshold may be set according to an actual application requirement.

E: Recommending the recommendation information to the user.

Optionally, to improve the quality of the recommendation information, before the recommendation information is determined, information quality of each real-time information item in the candidate recommendation information items may be determined. For example, a quality factor of a news item may be determined by text recognition. A junk article or an advertising article may have a low quality-score. That is, before determining the recommendation information from the candidate recommendation information items according to the interest correlativeness, the timeliness, and the click-through model factors, the information quality of each real-time information item in the candidate recommendation information items may also be determined.

Specifically: the recommendation information from the candidate recommendation information items may be determined according to the interest correlativeness, the timeliness, the click-through model factors, and the information quality by, for example, scoring the real-time information items in the candidate recommendation information items according to the interest correlativeness, the timeliness, the click-through model factors, and the information quality; and determining real-time information items whose score are higher than a preset threshold as the recommendation information.

It should be noted that the inverted index of the real-time information items may be obtained by collecting original real-time information items and collecting statistics on the original real-time information items. That is, before recalling corresponding real-time information items from an inverted index of real-time information according to the interest of the user to obtain candidate recommendation information items, the followings may be performed, including: obtaining the original real-time information items from an original real-time information database; extracting features of the obtained original real-time information items; performing category prediction and topic prediction on the original real-time information items according to the extracted features to determine a category and a subject of each original real-time information; performing text field weighting after performing property weighting processing on content of the obtained original real-time information items to determine a keyword to which the original real-time information item belongs; and calculating an inverted index of original real-time information item in the original real-time information database according to the category, the subject, and the keyword of each original real-time information item to obtain the inverted index of the real-time information.

Accordingly, when recalling corresponding real-time information items from an inverted index of real-time information according to the interest of the user, to obtain candidate recommendation information items, the followings may be specifically performed: determining, according to the interest of the user, a category, a subject, and/or a keyword in which the user is interested, and obtaining, from the inverted index of the real-time information, one or more original real-time information items that are the same as, similar to, or close to the category, the subject, and/or the keyword in which the user is interested, so as to obtain the candidate recommendation information items.

For example, synonyms and/or near-synonyms may be set for words involved in the category, the subject, and/or the keyword in which the user is interested. If the category, the subject, and/or the keyword of the original real-time information item include words the same as these synonyms and/or near-synonyms, it is determined that the original real-time information item is original real-time information that is similar to or close to the category, the subject, and/or the keyword in which the user is interested.

Accordingly, in this embodiment, user behavior data is obtained, a short-term interest, a long-term interest, and a real-time interest of a user are respectively calculated according to the user behavior data, then an interest of the user is determined according to the short-term interest, the long-term interest, and the real-time interest of the user, and real-time information is recommended to the user based on the interest of the user. In this solution, when the interest of the user is calculated, not only the long-term interest of the user is taken into consideration, but also the short-term interest and the real-time interest of the user are taken into consideration, so as to reflect changes in interests of the user with time. Therefore, compared with the existing technology, real-time information in which the user is most-likely interested currently can be more flexibly and accurately recommended to the user in time, thereby greatly improving the recommendation effect while improving timeliness.

In addition, in the process of calculating the candidate recommendation information items, not only an interest correlativeness of the real-time information may be considered, but also timeliness of the real-time information, a click-through rate of a keyword, information quality, and the like may also be considered. Therefore, closeness of a relationship between the recommendation information and the interest of the user can be more accurately described, thereby further improving recommendation quality and the recommendation effect.

Figure 2:
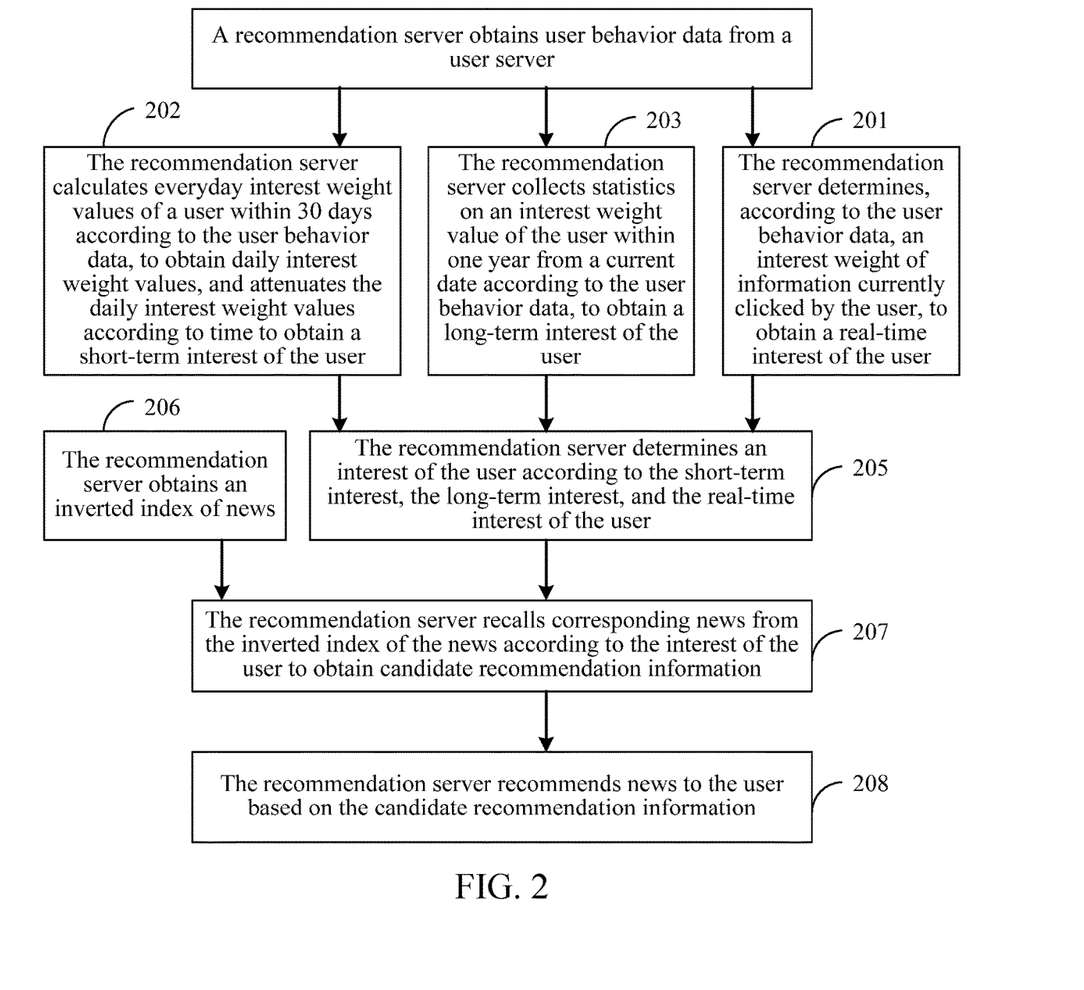
FIG. 2 is a flowchart of another method for recommending real-time information according to an embodiment of the present invention.

According to another embodiment of the present disclosure, a recommendation server incorporating the apparatus for recommending real-time information is provided, and a method for recommending the real-time information is also provided. As shown in FIG. 2, a specific procedure of a method for recommending real-time information may include the followings.

201: A recommendation server obtains user behavior data from a user server. The user behavior data refers to related data that may be used for user behavior analysis, for example, data such as browsing history, clicking history, and/or downloading history of a user.

202: The recommendation server calculates daily interest weights of the user within 30 days according to the user behavior data, to obtain daily interest weights, and attenuates the daily interest weights according to time, to obtain a short-term interest of the user. For example, this step may be specifically as follows:

A: Determining, according to the daily interest weights, an interest weight that currently needs to be attenuated.

B: Attenuating, according to time, the interest weight that needs to be attenuated, to obtain an attenuated interest weight.

For example, a date difference between a date of the interest weight that needs to be attenuated and a current date may be determined; a product of the date difference and a preset attenuation coefficient is calculated, and a difference between 1 and the product is calculated; and then the interest weight that needs to be attenuated is multiplied by the difference to obtain the attenuated interest weight. This may be represented by the following formula:

$$\text{final\_weight}_k = \text{interesr\_weight}_k * (1 - D * \mu)$$

where $\mu$ represents the attenuation coefficient, D represents the date difference between the date of the interest weight that needs to be attenuated and the current date, $\text{interest\_weight}_k$ represents the interest weight that needs to be attenuated, and $\text{final\_weight}_k$ represents the attenuated interest weight; and the attenuation coefficient may be set according to an actual application requirement.

C: Repeating A and B until all interest weights that need to be attenuated in the daily interest weights are attenuated. That is, attenuation processing is performed according to time on the interest weight of each day to obtain attenuated daily interest weight for each day within the preset period of time.

D: Performing statistical analysis on all obtained attenuated interest weights to obtain the short-term interest of the user.

For example, if the current date is August 10, daily interest weights within 30 days, that is, from July 12 to August 10 may be obtained by using August 10 as a baseline. Then, the daily interest weights are attenuated according to time. For example, using August 8 as an example, because a date difference between August 8 and August 10 is two days, an attenuated interest weight $\text{final\_weight}_{28}$ on August 8 is:

$$\text{final\_weight}_{28} = \text{interest\_weight}_{28} * (1 - 2 * \mu).$$

Certainly, other attenuation methods may also be used.

203: The recommendation server collects statistics on an interest weight of the user within one year from a current date according to the user behavior data to obtain a long-term interest of the user.

For example, specifically, statistics may be collected on monthly behaviors of the user within one year from a current date according to the user behavior data; each monthly interest weight are calculated according to the monthly behaviors of the user; an average interest weight within one year is calculated according to each monthly interest weight; and statistics is collected on the average interest weight to obtain the long-term interest of the user.

Each monthly interest weight may be attenuated according to time to obtain attenuated interest weights. Then, statistics are collected on these attenuated interest weights to obtain the long-term interest of the user.

204: The recommendation server determines, according to the user behavior data, an interest weight of information currently clicked by the user to obtain a real-time interest of the user.

For example, if a message currently clicked by the user includes a keyword (or a label) "NBA", it is determined that the current interest of the user is "NBA". Therefore, a weight of the keyword "NBA" may be calculated. The rest can be deduced by analogy, and the real-time interest of the user may be obtained. Certainly, the above described steps 202, 203, and 204, as with other steps, may be sequentially performed or may be performed out of sequence.

205: The recommendation server determines an interest of the user according to the short-term interest, the long-term interest, and the real-time interest of the user.

For example, the short-term interest, the long-term interest, and the real-time interest of the user may be merged according to a preset rule to obtain the interest of the user.

Various ways may be used to merge the interests. For example, individual weights may be respectively set for the short-term interest, the long-term interest, and the real-time interest and, based on these respective weights, the short-term interest, the long-term interest, and the real-time interest are merged together. For another example, a function may be set for the relationships among the short-term interest, the long-term interest, and the real-time interest, and then the short-term interest, the long-term interest, and the real-time interest are merged together by using the function. Other ways may also be used.

206: The recommendation server obtains an inverted index of news. For example, followings may be specifically performed: obtaining original news from an original real-time information database; extracting certain features of the obtained original news; performing category prediction and topic prediction on the original news according to the extracted features to determine a category and a subject of the original news; performing text field weighting after performing property weighting processing on content of the obtained original news to determine a keyword to which the original news belongs; and calculating an inverted index of original news in the original news base according to the category, the subject, and the keyword of the original news to obtain the inverted index of news.

The original real-time information database may be stored in the recommendation server, or may be stored in another device, for example, an information server. The category of the original news may be predicted (i.e., category prediction) by using liblinear (a technology used for generating a categorizer) to obtain the category of the original news.

The subject of the original news may be predicted (that is, topic prediction) by using a subject model (e.g., LDA or latent Dirichlet allocation), that is, latent subject information in a document of the original news may be recognized by using LDA, to obtain the subject of the original news.

Property weighting processing may be performed on the content of the obtained original news by using term frequency-inverse document frequency (TF-IDF). TF-IDF is a common weighting technology used for information retrieval and data mining. TF-IDF is also a statistics method, used for evaluating an importance degree of a word for a document in a document set or a corpus.

207: The recommendation server recalls corresponding news from the inverted index of the news according to the interest of the user to obtain candidate recommendation information items.

For example, specifically, a category, a subject, and/or a keyword in which the user is interested may be determined according to the interest of the user, and original news that is the same as, similar to, or close to the category, the subject, and/or the keyword in which the user is interested is obtained from the inverted index of the news to obtain the candidate recommendation information items.

208: The recommendation server recommends news to the user based on the candidate recommendation information items. For example, followings may be specifically performed.

A: Calculating a matching degree between each news item in the candidate recommendation information items and the interest of the user to obtain an interest correlativeness between the news and the user.

B: Determining freshness of each news item by determining a release time of each news item in the candidate recommendation information items to obtain timeliness of the news. More recent news has higher timeliness.

C: Determining a click-through rate of each news item in the candidate recommendation information items, and calculating a click-through model factor (CM) according to the click-through rate. News having a greater click-through rate has a greater model factor.

D: Determine information quality of each news item in the candidate recommendation information items. For example, a quality factor of a news item may be determined by text recognition. A junk article or an advertising article has a low quality-score.

E: Determining the recommendation news from the candidate recommendation information items according to the interest correlativeness, the timeliness, the click-through model factors, and the information quality. For example, the followings may be specifically performed: scoring the news in the candidate recommendation information items according to the interest correlativeness, the timeliness, the click-through model factors, and the information quality; and determining news whose score is higher than a preset threshold as the recommendation news.

F: Recommending the recommendation news to the user. Of course, the above described steps may be sequentially performed or performed out of sequence.

According to the embodiment, user behavior data is obtained, a short-term interest, a long-term interest, and a real-time interest of a user are respectively calculated according to the user behavior data, then an interest of the user is determined according to the short-term interest, the long-term interest, and the real-time interest of the user, and news is recommended to the user based on the interest of the user. In this solution, when the interest of the user is calculated, not only the long-term interest of the user is taken into consideration, but also the short-term interest and the real-time interest of the user are taken into consideration, to reflect changes in interests of the user with time. Therefore, compared with the existing technology, news in which the user is most-likely interested currently can be more flexibly and accurately recommended to the user in time, thereby greatly improving a recommendation effect while improving timeliness.

In addition, in the process of calculating the news, not only an interest correlativeness between the news and the user may be considered, but also timeliness of the news, a click-through rate of a keyword, news quality, and the like may also be considered. Therefore, closeness of a relationship between the information and the interest of the user may be more accurately described, thereby further improving recommendation quality and recommendation effect.

Figure 3A:
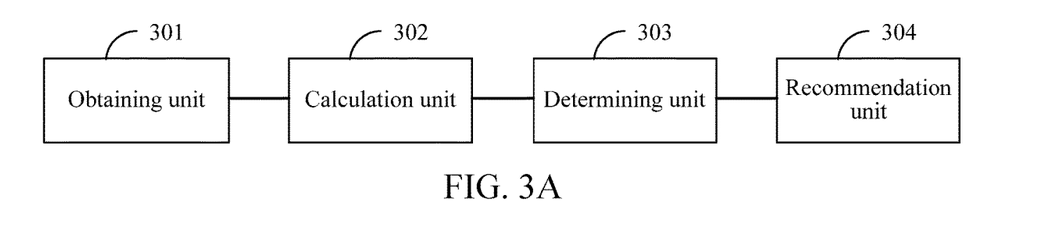
FIG. 3A is a structural diagram of an apparatus for recommending real-time information according to an embodiment of the present invention.

According to another embodiment of the present disclosure, an apparatus for recommending real-time information is further provided. As shown in FIG. 3A, the apparatus for recommending real-time information includes: an obtaining unit 301, a calculation unit 302, a determining unit 303, and a recommendation unit 304.

The obtaining unit 301 is configured to obtain user behavior data. The user behavior data refers to related data that may be used for user behavior analysis, for example, browsing history, clicking history, and/or downloading history of a user. An example in which the user behavior data is stored in a user server is used, in which case the user behavior data may be specifically obtained from the user server.

The calculation unit 302 is configured to respectively calculate a short-term interest, a long-term interest, and a real-time interest of a user according to the user behavior data. For example, the calculation unit 302 may include: a first calculation subunit, a second calculation subunit, and a third calculation subunit.

The first calculation subunit is configured to: calculate a daily interest weight of the user in a preset period according to the user behavior data to obtain a daily interest weight, and to attenuate the daily interest weight according to time to obtain the short-term interest of the user.

For example, the first calculation subunit may be specifically configured to: determine, according to the obtained daily interest weight, an interest weight that currently needs to be attenuated; attenuate, according to time, the interest weight that needs to be attenuated to obtain an attenuated interest weight; continue determining and attenuating the interest weight that currently needs to be attenuated until attenuation of all interest weights that need to be attenuated in the daily interest weight is finished; and collect statistics on all obtained attenuated interest weights to obtain the short-term interest of the user.

When attenuating the interest weight that needs to be attenuated, the first calculation subunit may be specifically configured to: determine a date difference between a date of the interest weight that needs to be attenuated and a current date; calculate a product of the date difference and a preset attenuation coefficient, and calculate a difference between 1 and the product; and multiply the interest weight that needs to be attenuated by the difference to obtain the attenuated interest weight. More details may be referred to the foregoing method embodiment. The preset period may be set according to an actual application requirement, for example, may be generally set to 7 days, 15 days, or 30 days.

The second calculation subunit is configured to calculate an interest weight of the user within a preset time range according to the user behavior data to obtain the long-term interest of the user.

The preset time range may be set according to an actual application requirement, and is at least greater than one day, for example, may be set to one quarter, one year, or two years.

For example, using one year as an example, the second calculation subunit may be specifically configured to: collect statistics on monthly behaviors of the user within one year from a current date according to the user behavior data; calculate each monthly interest weight according to the monthly behaviors of the user; calculate an average interest weight within one year according to each monthly interest weight; and collect statistics on the average interest weight, to obtain the long-term interest of the user.

Optionally, the second calculation subunit may also attenuate each monthly interest weight, according to time, to obtain attenuated interest weights; and then collect statistics on these attenuated interest weights to obtain the long-term interest of the user.

The third calculation subunit is configured to determine, according to the user behavior data, an interest weight of information currently clicked by the user to obtain the real-time interest of the user.

The determining unit 303 is configured to determine an interest of the user according to the short-term interest, the long-term interest, and the real-time interest of the user. For example, the determining unit 303 may be specifically configured to merge the short-term interest, the long-term interest, and the real-time interest of the user according to a preset rule, to obtain the interest of the user.

Various ways may be used to merge the interests. For example, individual weights may be respectively set for the short-term interest, the long-term interest, and the real-time interest and, based on these respective weights, the short-term interest, the long-term interest, and the real-time interest are merged together. For another example, a function may be set for the relationships among the short-term interest, the long-term interest, and the real-time interest, and then the short-term interest, the long-term interest, and the real-time interest are merged together by using the function. Other ways may also be used.

The recommendation unit 304 is configured to recommend real-time information to the user based on the interest of the user. The real-time information may be specifically information such as news. For example, the recommendation unit 304 may include a recall subunit and a recommendation subunit.

The recall subunit is configured to recall corresponding real-time information from an inverted index of real-time information according to the interest of the user to obtain candidate recommendation information items.

The recommendation subunit is configured to recommend the real-time information to the user based on the candidate recommendation information items. Specifically, the recommendation subunit may be configured to: calculate a matching degree between each real-time information item in the candidate recommendation information items and the interest of the user to obtain an interest correlativeness of the real-time information; determine freshness of each real-time information item by determining a release time of each real-time information item in the candidate recommendation information items to obtain timeliness of the real-time information; determine a click-through rate of each real-time information item in the candidate recommendation information items, and calculate a click-through model factor according to the click-through rate; determine recommendation information from the candidate recommendation information items according to the interest correlativeness, the timeliness, and the click-through model factors; and recommend the recommendation information to the user.

Optionally, to improve quality of the recommendation information, before the recommendation information is determined, information quality of each real-time information item in the candidate recommendation information items may be determined. For example, a quality factor of a news item may be determined by text recognition. A junk article or an advertising article has a low quality-score.

The recommendation subunit may be specifically configured to: calculate a matching degree between each real-time information item in the candidate recommendation information items and the interest of the user, to obtain an interest correlativeness of the real-time information; determine freshness of each real-time information item by determining a release time of each real-time information item in the candidate recommendation information items to obtain timeliness of the real-time information; determine a click-through rate of each real-time information item in the candidate recommendation information items, and calculate a click-through model factor according to the click-through rate; determine information quality of each real-time information item in the candidate recommendation information items; determine recommendation information from the candidate recommendation information items according to the interest correlativeness, the timeliness, the click-through model factors, and the information quality; and recommend the recommendation information to the user.

Figure 3B:
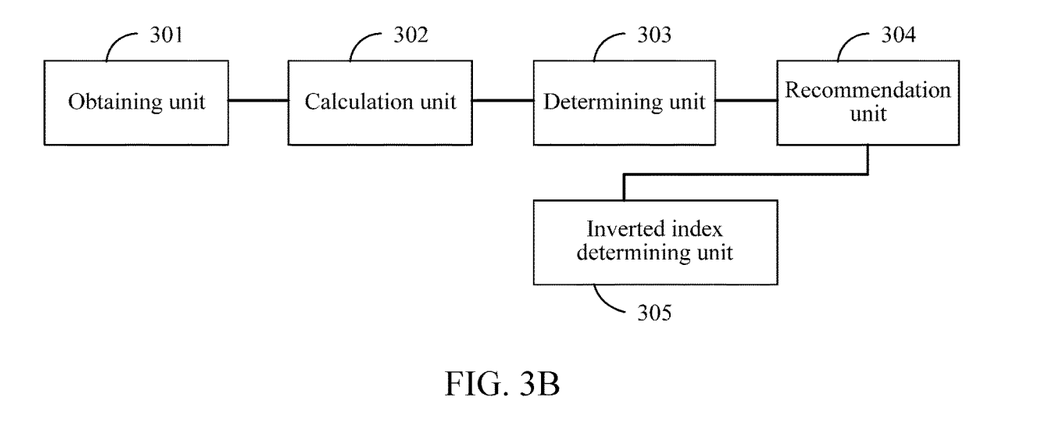
FIG. 3B is a structural diagram of another apparatus for recommending real-time information according to an embodiment of the present invention.

It should be noted that the inverted index of the real-time information may be obtained by collecting original real-time information and collecting statistics on the original real-time information. That is, as shown in FIG. 3B, the apparatus for recommending real-time information may further include an inverted index determining unit 305.

The inverted index determining unit 305 may be configured to: obtain original real-time information from an original real-time information database; extract a feature of the obtained original real-time information; perform category prediction and topic prediction on the original real-time information according to the extracted feature, to determine a category and a subject of the original real-time information; perform text field weighting after performing property weighting processing on content of the obtained original real-time information, to determine a keyword to which the original real-time information belongs; and calculate an inverted index of original real-time information in the original real-time information database according to the category, the subject, and the keyword of the original real-time information, to obtain the inverted index of the real-time information.

In such case, the recall subunit is specifically configured to: determine, according to the interest of the user, a category, a subject, and/or a keyword in which the user is interested, and obtain, from the inverted index of the real-time information, original real-time information that is the same as, similar to, or close to the category, the subject, and/or the keyword in which the user is interested to obtain the candidate recommendation information items.

During specific implementation, the foregoing units may be implemented as independent entities, or may be arbitrarily combined, and implemented as a same entity or several entities. For specific implementation of the foregoing units, refer to the foregoing method embodiment, and details are not described herein again.

The apparatus for recommending real-time information may be specifically integrated into a server, for example, a recommendation server.

According to the embodiment, the obtaining unit 301 of the apparatus for recommending real-time information may obtain user behavior data, the calculation unit 302 respectively calculates a short-term interest, a long-term interest, and a real-time interest of a user according to the user behavior data, then the determining unit 303 determines an interest of the user according to the short-term interest, the long-term interest, and the real-time interest of the user, and the recommendation unit 304 recommends real-time information to the user based on the interest of the user. In this solution, when the interest of the user is calculated, not only the long-term interest of the user is taken into consideration, but also the short-term interest and the real-time interest of the user are taken into consideration, to reflect changes in interests of the user with time. Therefore, compared with the existing technology, real-time information in which the user is most-likely interested currently can be more flexibly and accurately recommended to the user in time, thereby greatly improving the recommendation effect while improving timeliness.

In addition, in the process in which the recommendation unit 304 calculates the candidate recommendation information items, not only an interest correlativeness of the real-time information may be considered, but also timeliness of the real-time information, a click-through rate of a keyword, information quality, and the like may also be considered. Therefore, closeness of a relationship between the information and the interest of the user can be more accurately described, thereby further improving recommendation quality and the recommendation effect.

In addition, this embodiment of the present invention further provides a system for recommending real-time information, which may include the apparatus for recommending real-time information provided in any one of the embodiments of the present invention. The apparatus for recommending real-time information may be specifically integrated into a server, for example, a recommendation server. The following description is provided using the recommendation server as an example.

The recommendation server is configured to: obtain user behavior data; respectively calculate a short-term interest, a long-term interest, and a real-time interest of a user according to the user behavior data; determine an interest of the user according to the short-term interest, the long-term interest, and the real-time interest of the user; and recommend real-time information to the user based on the interest of the user.

Specifically, for the short-term interest, a daily interest weight of the user in a preset period is calculated according to the user behavior data, to obtain a daily interest weight, and the daily interest weight is attenuated, according to time, to obtain the short-term interest of the user. The preset period may be set according to an actual application requirement, for example, may be generally set to 7 days, 15 days, or 30 days.

For the long-term interest, an interest weight of the user within a preset time range is calculated according to the user behavior data to obtain the long-term interest of the user. The preset time range may be set according to an actual application requirement, and is at least greater than one day, for example, may be set to one quarter, one year, or two years.

For the real-time interest, an interest weight of information currently clicked by the user is determined according to the user behavior data to obtain the real-time interest of the user.

When recommending the real-time information to the user, the recommendation server may specifically recall corresponding real-time information from an inverted index of real-time information according to the interest of the user, so as to obtain candidate recommendation information items, and then recommend the real-time information to the user based on the candidate recommendation information items. For example, the recommendation server may calculate parameters such as interest correlativeness, timeliness, click-through model factors, and information quality of the real-time information, and then determine recommendation information from the candidate recommendation information items according to the interest correlativeness, the timeliness, the click-through model factors, and the information quality.

It should be noted that the inverted index of the real-time information may be obtained by collecting original real-time information and collecting statistics on the original real-time information. For example, the recommendation server may be configured to obtain the original real-time information from an original real-time information database; extract a feature of the obtained original real-time information; perform category prediction and topic prediction on the original real-time information according to the extracted feature, to determine a category and a subject of the original real-time information; perform text field weighting after performing property weighting processing on content of the obtained original real-time information, to determine a keyword to which the original real-time information belongs; and calculate an inverted index of original real-time information in the original real-time information database according to the category, the subject, and the keyword of the original real-time information, to obtain the inverted index of the real-time information.

In addition, the system for recommending real-time information may further include another device, for example, user equipment, and optionally, may further include a user server and an information server.

The user equipment may be configured to receive the real-time information recommended by the recommendation server. The user server may be configured to: store the user behavior data, and provide the user behavior data for the recommendation server. The information server may be configured to: store the original real-time information, and provide the original real-time information for the recommendation server.

The system for recommending real-time information may include the apparatus for recommending real-time information provided in any one of the embodiments of the present invention and, therefore, can achieve the beneficial effects that can be achieved by the apparatus for recommending real-time information provided in any one of the embodiments of the present invention.

A person of ordinary skill in the art may understand that all or part of the steps of the methods in the foregoing embodiments may be implemented by a program instructing relevant hardware. The program may be stored in a computer readable storage medium. The storage medium may include: a read-only memory (ROM), a random access memory (RAM), a magnetic disk, an optical disc, or the like.

Figure 4:
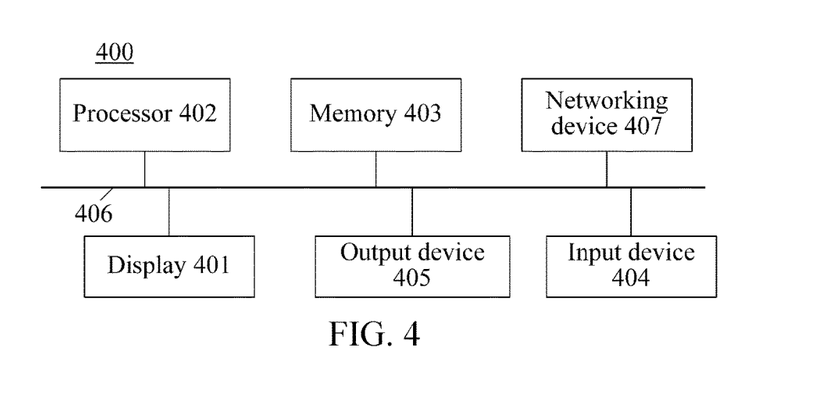
FIG. 4 is a structural diagram of a computing system according to an embodiment of the present invention.

For example, FIG. 4 illustrates an exemplary computing system for implementing the various modules, units, apparatus, and systems. As shown in FIG. 4, the computing system 400 includes: a display 401, a processor 402, a memory 403, an input device 404 (for example, a peripheral device such as a collection device including a camera, a microphone, and a headset; a mouse, a joystick, or a desktop computer keyboard; or a physical keyboard or a touchscreen on a notebook computer or a tablet computer), an output device 405 (for example, an audio output device or a video output device including a speaker, a headset, and the like), a bus 406, and a networking device 407.

The processor 402 may include any appropriate hardware processing unit, such as a central processing unit (CPU), a graphic processing unit (GPU), or a microcontroller, etc. The processor 402, the memory 403, the input device 404, the display 401, and the networking device 407 are connected by using the bus 406, and the bus 406 is used for data transmission and communication between the processor 402, the memory 403, the display 401, and the networking device 407.

The input device 404 is mainly configured to obtain an input operation of a user, and the input device 404 may include any appropriate device, such as a mouse, a keyboard, or a touchscreen, etc. The networking device 407 is used to connect to other devices and systems.

The method, the apparatus, and the system for recommending real-time information provided in the embodiments of the present invention are described above in detail. Although the principles and implementations of the present disclosure are described by using specific examples in this specification, the descriptions of the foregoing embodiments are merely intended to help understand the method and the core idea of the method of the present disclosure. Meanwhile, a person skilled in the art may make modifications to the specific implementations and application range according to the idea of the present disclosure. In conclusion, the content of this specification should not be construed as a limitation to the present disclosure.

What is claimed is:

1. A method for recommending real-time information, comprising:

obtaining original real-time information items from an original real-time information database, the original real-time information items including news;

extracting features of the obtained original real-time information items;

performing category prediction and topic prediction on the original real-time information items according to the extracted features to determine a category and a subject of each original real-time information item;

performing text field weighting after performing property weighting processing on content of the original real-time information items to determine a keyword to which each original real-time information item belongs;

calculating an inverted index of the original real-time information items according to the category, the subject, and the keyword of each original real-time information item;

obtaining user behavior data of a user;

based on the user behavior data, respectively calculating a short-term interest, a long-term interest, and a real-time interest of the user;

determining an interest of the user by merging the short-term interest, the long-term interest, and the real-time interest of the user according to a relationship function and respective weights of the short-term interest, the long-term interest, and the real-time interest, wherein the interest of the user corresponding to one keyword is a combination result of the respective weights of the short-term interest, the long-term interest, and the real-time interest of the keyword; and recommending real-time information to the user based on the interest of the user, comprising:

determining a category, a subject, and a keyword interested by the user according to the interest of the user;

recalling, from the inverted index of the original real-time information items, real-time information items that have the same as, similar to, or close to the category, the subject, and the keyword interested by the user to obtain candidate recommendation information items; and recommending the real-time information to the user based on the candidate recommendation information items wherein the respectively calculating a short-term interest, a long-term interest, and a real-time interest of the user comprises:

based on the user behavior data, calculating a daily interest weight of the user for each day within a preset period to obtain daily interest weights, and attenuating the daily interest weights according to time to obtain the short-term interest of the user;

based on the user behavior data, calculating an interest weight of the user within a preset time range to obtain the long-term interest of the user, wherein the preset time range is greater than one day; and based on the user behavior data, determining an interest weight of information currently clicked by the user to obtain the real-time interest of the user.

2. The method according to claim 1, wherein the attenuating the daily interest weights according to time to obtain the short-term interest of the user comprises:

based on the daily interest weights, determining an interest weight that currently needs to be attenuated;

attenuating, according to time, the interest weight that needs to be attenuated to obtain an attenuated interest weight;

repeating the determining interest weight and attenuating the interest weight until all interest weights that need to be attenuated in the daily interest weights are attenuated; and performing statistical analysis on the obtained attenuated interest weights to obtain the short-term interest of the user.

3. The method according to claim 2, wherein the attenuating, according to time, the interest weight that needs to be attenuated to obtain an attenuated interest weight comprises:

determining a date difference between a date of the interest weight that needs to be attenuated and a current date;

calculating a product of the date difference and a preset attenuation coefficient;

calculating a difference between 1 and the product; and multiplying the interest weight that needs to be attenuated by the difference between 1 and the product to obtain the attenuated interest weight.

4. The method according to claim 1, wherein the calculating an interest weight of the user within a preset time range according to the user behavior data to obtain the long-term interest of the user comprises:

according to the user behavior data, collecting statistics on monthly behavior of the user within one year from a current date;

calculating each monthly interest weight within one year according to the monthly behavior of the user;

calculating an average interest weight within one year according to each monthly interest weight; and performing statistical analysis on the average weight to obtain the long-term interest of the user.

5. The method according to claim 1, wherein the recommending the real-time information to the user based on the candidate recommendation information items comprises:

calculating a matching degree between each real-time information item in the candidate recommendation information items and the interest of the user to obtain an interest correlativeness of each real-time information item;

determining freshness of each real-time information item by determining a release time of each real-time information item in the candidate recommendation information items to obtain timeliness of the real-time information item;

determining a click-through rate of each real-time information item in the candidate recommendation information items, and calculating a click-through model factor according to the click-through rate;

determining recommendation information from the candidate recommendation information items according to the interest correlativeness, the timeliness, and the click-through model factors of the candidate recommendation information items; and recommending the recommendation information to the user.

6. The method according to claim 5, wherein the determining recommendation information from the candidate recommendation information items according to the interest correlativeness, the timeliness, and the click-through model factors comprises:

scoring the real-time information items in the candidate recommendation information items according to the interest correlativeness, the timeliness, and the click-through model factors; and determining real-time information items whose scores are higher than a preset threshold as the recommendation information.

7. The method according to claim 5, wherein the determining recommendation information from the candidate recommendation information items according to the interest correlativeness, the timeliness, and the click-through model factors comprises:

determining information quality of each real-time information item in the candidate recommendation information items; and determining the recommendation information from the candidate recommendation information items according to the interest correlativeness, the timeliness, the click-through model factors, and the information quality of the candidate recommendation information items.

8. The method according to claim 7, wherein the determining the recommendation information from the candidate recommendation information items according to the interest correlativeness, the timeliness, the click-through model factors, and the information quality comprises:

scoring the real-time information items in the candidate recommendation information items according to the interest correlativeness, the timeliness, the click-through model factors, and the information quality; and determining real-time information items whose scores are higher than a preset threshold as the recommendation information.

9. A non-transitory computer-readable storage medium containing computer-executable instructions for, when executed by one or more processors, cause the one or more processors to perform:

obtaining original real-time information items from an original real-time information database, the original real-time information items including news;

extracting features of the obtained original real-time information items;

performing category prediction and topic prediction on the original real-time information items according to the extracted features to determine a category and a subject of each original real-time information item;
performing text field weighting after performing property weighting processing on content of the original real-time information items to determine a keyword to which each original real-time information item belongs;
calculating an inverted index of the original real-time information items according to the category, the subject, and the keyword of each original real-time information item;
obtaining user behavior data of a user;
based on the user behavior data, respectively calculating a short-term interest, a long-term interest of the user;
determining an interest of the user by merging the short-term interest, the long-term interest, and the real-time interest of the user according to a relationship function and respective weights of the short-term interest, the long-term interest, and the real-time interest, wherein the interest of the user corresponding to one keyword is a combination result of the respective weights of the short-term interest, the long-term interest, and the real-time interest of the keyword; and
recommending real-time information to the user based on the interest of the user, comprising:
  determining a category, a subject, and a keyword interested by the user according to the interest of the user;
  recalling, from the inverted index of the original real-time information items, real-time information items that have the same as, similar to, or close to the category, the subject, and the keyword interested by the user to obtain candidate recommendation information items; and
  recommending the real-time information to the user based on the candidate recommendation information items,
wherein the respectively calculating a short-term interest, a long-term interest, and a real-time interest of the user comprises:
based on the user behavior data, calculating a daily interest weight of the user for each day within a preset period to obtain daily interest weights, and attenuating the daily interest weights according to time to obtain the short-term interest of the user;
based on the user behavior data, calculating an interest weight of the user within a preset time range to obtain the long-term interest of the user, wherein the preset time range is greater than one day; and
based on the user behavior data, determining an interest weight of information currently clicked by the user to obtain the real-time interest of the user.

10. The non-transitory computer-readable storage medium according to claim 9, wherein the attenuating the daily interest weights according to time to obtain the short-term interest of the user comprises:
based on the daily interest weights, determining an interest weight that currently needs to be attenuated;
attenuating, according to time, the interest weight that needs to be attenuated to obtain an attenuated interest weight;
repeating the determining interest weight and attenuating the interest weight until all interest weights that need to be attenuated in the daily interest weights are attenuated; and
performing statistical analysis on the obtained attenuated interest weights to obtain the short-term interest of the user.

11. The non-transitory computer-readable storage medium according to claim 10, wherein the attenuating, according to time, the interest weight that needs to be attenuated to obtain an attenuated interest weight comprises:
determining a date difference between a date of the interest weight that needs to be attenuated and a current date;
calculating a product of the date difference and a preset attenuation coefficient;
calculating a difference between 1 and the product; and
multiplying the interest weight that needs to be attenuated by the difference between 1 and the product to obtain the attenuated interest weight.

12. The non-transitory computer-readable storage medium according to claim 9, wherein the calculating an interest weight of the user within a preset time range according to the user behavior data to obtain the long-term interest of the user comprises:
according to the user behavior data, collecting statistics on monthly behavior of the user within one year from a current date;
calculating each monthly interest weight within one year according to the monthly behavior of the user;
calculating an average interest weight within one year according to each monthly interest weight; and
performing statistical analysis on the average weight to obtain the long-term interest of the user.

13. The non-transitory computer-readable storage medium according to claim 9, wherein the recommending the real-time information to the user based on the candidate recommendation information items comprises:
calculating a matching degree between each real-time information item in the candidate recommendation information items and the interest of the user to obtain an interest correlativeness of each real-time information item;
determining freshness of each real-time information item by determining a release time of each real-time information item in the candidate recommendation information items to obtain timeliness of the real-time information item;
determining a click-through rate of each real-time information item in the candidate recommendation information items, and calculating a click-through model factor according to the click-through rate;
determining recommendation information from the candidate recommendation information items according to the interest correlativeness, the timeliness, and the click-through model factors of the candidate recommendation information items; and
recommending the recommendation information to the user.

14. The non-transitory computer-readable storage medium according to claim 13, wherein the determining recommendation information from the candidate recommendation information items according to the interest correlativeness, the timeliness, and the click-through model factors comprises:
scoring the real-time information items in the candidate recommendation information items according to the interest correlativeness, the timeliness, and the click-through model factors; and determining real-time information items whose scores are higher than a preset threshold as the recommendation information.

15. The non-transitory computer-readable storage medium according to claim 13, wherein the determining recommendation information from the candidate recommendation information items according to the interest correlativeness, the timeliness, and the click-through model factors comprises:
- determining information quality of each real-time information item in the candidate recommendation information items; and
- determining the recommendation information from the candidate recommendation information items according to the interest correlativeness, the timeliness, the click-through model factors, and the information quality of the candidate recommendation information items.

16. The non-transitory computer-readable storage medium according to claim 15, wherein the determining the recommendation information from the candidate recommendation information items according to the interest correlativeness, the timeliness, the click-through model factors, and the information quality comprises:
- scoring the real-time information items in the candidate recommendation information items according to the interest correlativeness, the timeliness, the click-through model factors, and the information quality; and
- determining real-time information items whose scores are higher than a preset threshold as the recommendation information.

* * * * *